April 20, 1926.
H. I. MORRIS
1,581,758
MECHANISM FOR CONTROLLING THE DISCHARGE OF LIQUID FROM RECEPTACLES
Filed April 16, 1921    2 Sheets-Sheet 1
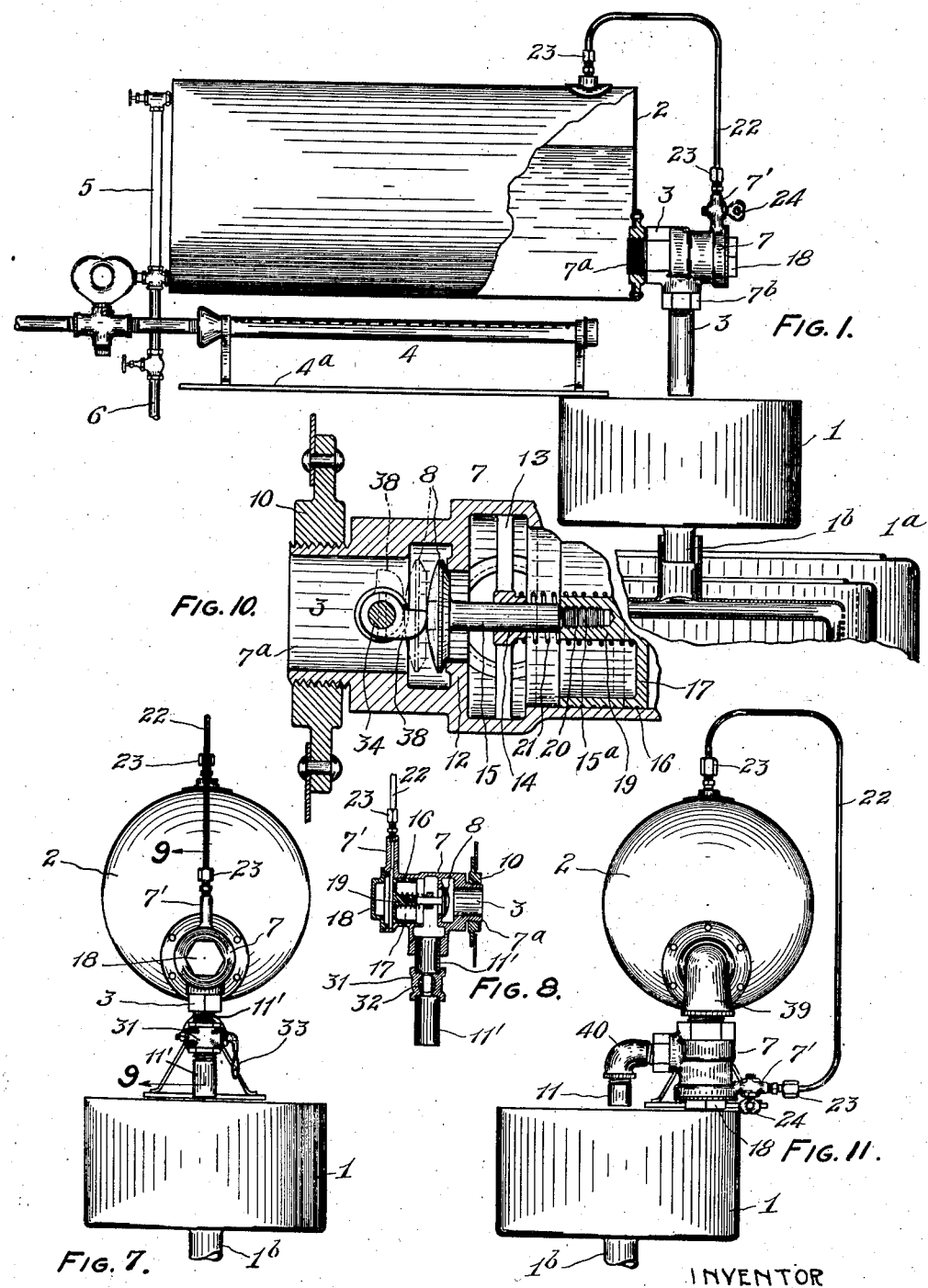
INVENTOR
Howard I. Morris
BY
ATTORNEY

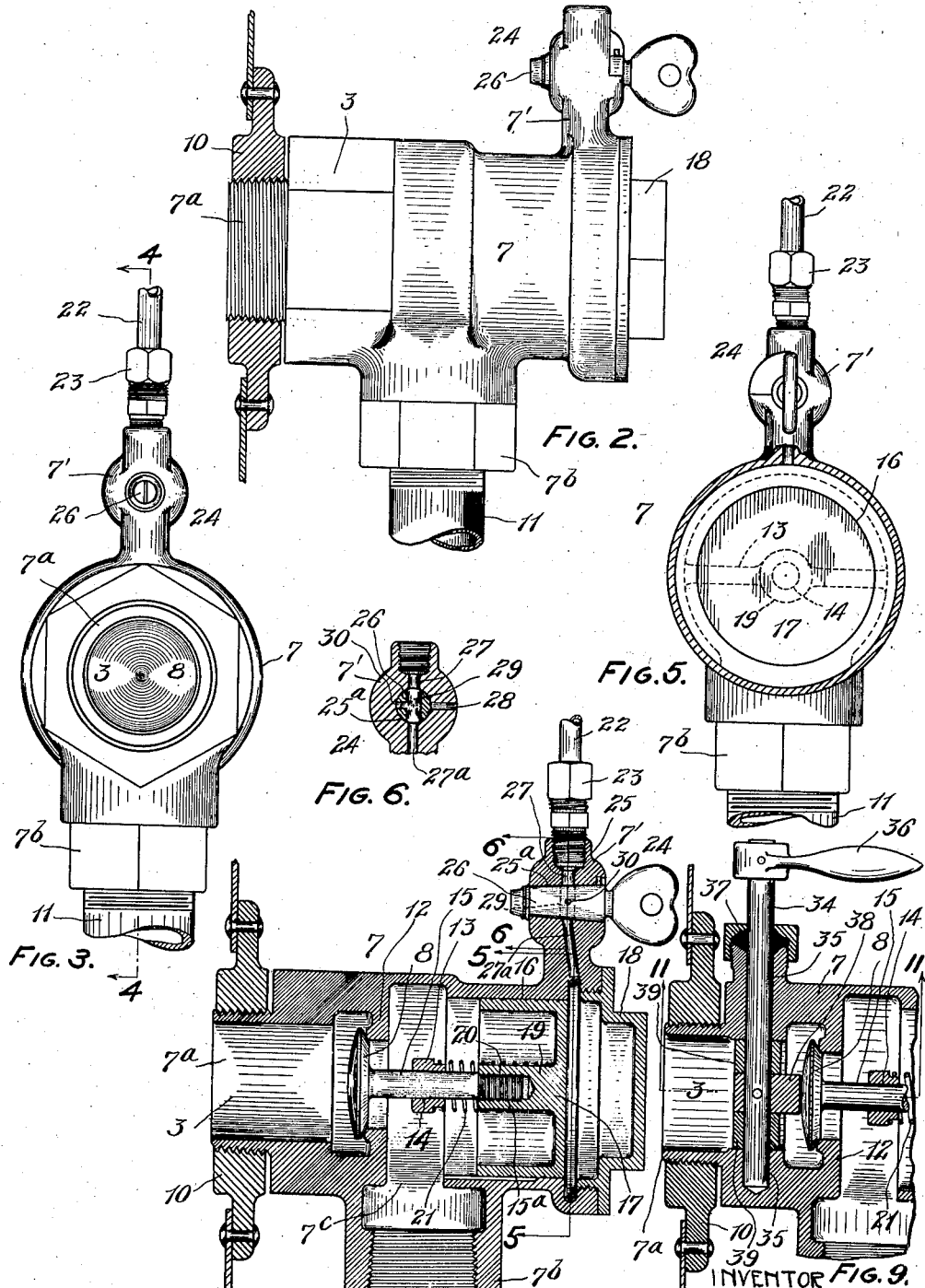

Patented Apr. 20, 1926.

1,581,758

UNITED STATES PATENT OFFICE.

HOWARD I. MORRIS, OF CLEVELAND, OHIO, ASSIGNOR TO THE YODER MORRIS COMPANY, OF CLEVELAND, OHIO, A CORPORATION OF OHIO.

MECHANISM FOR CONTROLLING THE DISCHARGE OF LIQUID FROM RECEPTACLES.

Application filed April 16, 1921. Serial No. 462,072.

*To all whom it may concern:*

Be it known that I, HOWARD I. MORRIS, a citizen of the United States, residing at Cleveland, in the county of Cuyahoga and State of Ohio, have invented certain new and useful Improvements in and Relating to Mechanism for Controlling the Discharge of Liquid from Receptacles, of which the following is a specification.

This invention relates to a mechanism for controlling the discharge of liquid from a receptacle, more particularly mechanism which prevents the discharge of the liquid from the receptacle until the liquid has been heated to or above a predetermined temperature.

One object of the invention is to provide a control mechanism for the discharge valve of a liquid holding receptacle which is adapted to operate or release said valve when the temperature of the liquid in the receptacle rises to the point of vaporization.

Another object of the invention is to associate with a liquid dispensing receptacle, a valve controlling mechanism in which provision is made to utilize vapor generated in the receptacle to release or open the valve, whereby discharge of the liquid is prevented until the temperature thereof rises to or slightly above the boiling point of the liquid.

Other objects of the invention will be apparent to those skilled in the art to which my invention relates from the following description taken in connection with the accompanying drawings.

In the drawings, Figure 1 is a side elevation, partly broken away, of a water heater having attached to it a discharge control mechanism embodying my invention.

Fig. 2 is a fragmentary view showing the discharge control mechanism in side elevation.

Fig. 3 is a front elevation of the parts shown in Fig. 2.

Fig. 4 is a longitudinal section on the line 4—4 of Fig. 3.

Fig. 5 is a section on the line 5—5 of Fig. 4.

Fig. 6 is a fragmentary section on the line 6—6 of Fig. 4.

Fig. 7 is a front elevation of a water heater showing a slightly modified arrangement of the discharge control mechanism.

Fig. 8 is a section on the line 9—9 of Fig. 7.

Fig. 9 is a fragmentary section similar to Fig. 4 but showing a further modified form of construction.

Fig. 10 is a fragmentary section on the line 11—11 of Fig. 9.

Fig. 11 is a front elevation of a water heater like that shown in Fig. 1, but illustrating the discharge control mechanism in a vertical position.

As one application of my invention and by way of example, I have illustrated it herein in connection with a coffee making apparatus, elements or parts of which are shown at 1, 1ª. In making coffee, it is desirable to use water which has been previously heated to or slightly above its boiling point in order that certain ingredients of the coffee bean may be quickly extracted therefrom and mixed with the water to make the coffee, and by means of my invention I am enabled to prevent the discharge of the water, which is to be mixed with the ground coffee, until it has been heated to or above the boiling point. As a result, I am enabled to make batches of coffee of uniform quality at all times in the most economical manner.

2 indicates a receptacle in which the water to be used for making coffee is heated and from which the water is discharged or dispensed through a conduit 3, preferably to the container 1. The container 1 may be used as a measuring device to measure the water for each charge of coffee to be made up. The container 1 is provided with a discharge nozzle 1ᵇ, which supplies the heated water to the inlet or receiving member 1ª of the coffee making apparatus.

4 indicates as an entirety a means for heating the water in the receptacle 2 to the desired temperature, whereby the water may be brought to or above its boiling point or that temperature desired for making coffee. In the desired form of construction I prefer to heat the water to a point slightly above the boiling point, whereby steam or vapor is generated for a purpose to be later set forth. The heating means 4 may be of any desired character. The heating means 4 may be supported on a bracket or platform 4ª below the tank 2. 5 indicates a water gage preferably provided on the rear wall of the container 2. 6 indicates a connection leading from a source of water supply, whereby the tank 2 may be refilled when desired.

7 indicates a casing in which is mounted a discharge valve 8 that controls the flow of water through the conduit 3. The casing 7 is provided with collars 7ª, 7ᵇ, the former being screw-threaded to a coupling member 10, which forms a part of one wall of the receptacle 2, and the latter extending from one side of the casing 7 and being detachably connected to a pipe section 11. The side wall of the casing 7 is broken away, as shown at 7ᶜ, so that the collars 7ª, 7ᵇ, the inner portion of the casing 7, the broken away portion 7ᶜ and pipe section 11 (when the latter is provided) form the water conduit 3.

12 indicates an annular wall arranged within the casing 7 and adjacent the collar 7ª and arranged to form a seat for the valve 8. 13 indicates a bar or bridge-piece extending between the inner sides of the casing 7 and preferably formed integrally therewith. At its center and in line with the axis of the valve seat 12, the bar 13 is formed with an opening 14, in which the stem 15 of the valve 8 is slidably mounted. The outer or free end of the valve stem is preferably provided with screw threads 15ª for a purpose to be later set forth. The outer portion of the casing 7 is preferably enlarged and bored out to form a cylinder 16 for a reciprocating piston 17. The outer end of the casing 7, which forms the head of the cylinder 16, preferably consists of a cap 18. The cap 18 may have screw-thread connection with the inner walls of the cylinder 16, as shown in Fig. 4. The inner side of the piston head is provided with an inwardly extending, centrally arranged boss 19, in which is formed a screw-threaded opening 20 to adjustably receive the screw-threaded end 15ª of the valve stem 15, this construction serving to rigidly connect the valve 8 and piston 17 together. 21 indicates a spring, preferably coiled around the stem 15 and boss 19, and interposed between the head of the piston and bridge-piece 13; the spring 21 normally tends to move the piston outwardly and to maintain the valve 8 against its seat 12. The surface area of the piston 17 is considerably greater than that of the valve 8, in order that the valve may be operated upon the generation of a relatively low steam pressure. As it is desirable to open the valve as soon as the water in the tank 2 boils, this arrangement insures positive and quick operation of the valve 8, as relatively low pressure is required to operate the piston 17.

22 indicates a pipe extending from the upper end or wall of the receptacle or tank 2 to the cylinder 16. The pipe 22 is connected by suitable couplings or unions 23 to the wall of the tank 2 and an integral lug 7′ provided on the casing 7, whereby the pipe may form a conduit for steam or vapor to convey it to a point behind the head of the piston 17.

In operation, the tank 2 is filled with water to the desired height and the heating means 4 is applied below the tank; there being no pressure in the tank 2, the piston 17 will be positioned and maintained at or adjacent the outer end of the cylinder 16 due to the tension of the spring 21, supplemented by the pressure of the water against the valve 8. The heating means 4 will serve to heat the water and will ultimately generate sufficient steam or vapor to overcome the tension of the spring 21 and pressure of the water on the valve 8, whereupon the piston 17 will be moved inwardly and thus open the valve 8, allowing the water to flow through the conduit 3 to the receptacle 1. As it is undesirable to use the water until it is heated to or above its boiling point, it will be seen that the valve 8 will remain closed until sufficient steam pressure has been generated to operate the piston 17. The spring 21 is preferably arranged to exert but slight pressure on the piston 17 in order that the same may be operated by the steam or vapor resulting from the heating of the water to approximately two degrees above its boiling point.

In practice, I prefer to provide a tank 2 which will hold a large quantity or plurality of charges of water and to measure each charge of water discharged from the tank 2 for each charge or batch of coffee to be made; accordingly, in order that the dispensing of the water from the tank 2 may be controlled, I provide a valve mechanism, indicated as an entirety at 24, which, in the preferred form of construction, as shown in Figs. 1, 2, 3, 4 and 5, is arranged in the steam conduit 22, so as to positively cut off or admit steam or vapor to the cylinder 16, behind the piston 17. The valve mechanism 24 preferably comprises a seat member 25 formed by enlarging the lug 7′ and a valve 26 having ports and conduits so arranged and correlated that steam may be admitted to the cylinder 16, or cut off, or any steam admitted to the cylinder may be allowed to escape.

As shown in Fig. 4, the seat member 25 has formed through it conduits 27, 27ª, communicating with the pipe 22 through the union 23 therefor, and with the cylinder 16, respectively. The seat member is also bored out to form a seat 25ª for the conical valve 26. At one side of the valve seat, the wall of the seat member 25 is formed with an escape passage 28 (see Fig. 6). The valve 26 is formed with two connected openings 29, 30, so arranged that when the valve 26 is in one position (see Fig. 6) steam will pass through the opening 29 in the valve, and through the conduit 27ª to the cylinder 16, but when the valve is turned one-fourth way around, in an anti-clockwise direction as viewed in Fig. 6, the opening 30 will register with the conduit 27ª and the opening 29 will register with the passage 28, whereby any steam which may be in the cylinder will escape through the latter.

In practice, the valve 26 is kept closed. If it is desired to discharge water from the tank 2, the valve 26 is operated, that is, opened. If the water has been heated sufficiently to generate steam or vapor, the latter will flow into the cylinder, operate the piston and open the valve 8; and accordingly, the water may be used. On the other hand, if the temperature of the water has not been raised sufficiently to generate steam or vapor, there will not be sufficient pressure to operate the piston when the valve 26 is opened and therefore the valve 8 will remain closed. The operation of the valve 26 can be repeated as often as desired and so long as the valve 8 remains closed, the operator can tell the water has not reached the desired temperature. Further, since the piston will not operate until sufficient steam or vapor has been generated to overcome the spring 21 and water pressure on the valve 8, it will be seen that only water above a predetermined temperature can be dispensed from the tank 2.

When the desired quantity of water has been discharged from the tank 2 the valve 26 is closed and positioned to permit the escape of steam from the cylinder 16 through the passage 28, whereupon the spring 21 acting on the piston 17, supplemented by the pressure of the water on the valve head, will close the valve 8 against its seat.

My invention is particularly advantageous for heating water for coffee making purposes. As will be understood, it prevents the discharge of the water until the latter has been heated to or slightly above that temperature which produces the best quality of coffee. Since the water cannot be discharged from the water tank before it boils, no waste of the water or ground coffee occurs; furthermore, the operative is enabled to always make coffee of the same character or quality.

In Figs. 7 and 8 I have illustrated a slightly modified form of my invention in which the controlling valve mechanism is interposed in the pipe 11. In these views, 31 indicates a casing member connected to adjoining ends of the pipe sections 11', 11' and provided with a seat for a valve element 32 which serves to open or cut off the flow of water through the pipe sections 11', 11'. The valve element 32 is provided with a handle 33.

In this form of construction, it will be understood that the valve element 32 is normally positioned to close the discharge pipe 11 and the valve 8 remains closed while the water is being heated for reasons which have already been explained. It will be apparent that if the valve 32 is operated prior to the heating of the water to a temperature which will generate sufficient vapor, no water will be discharged to the container 1 since the valve 8 remains closed. If the water has been heated sufficiently to generate vapor, it will act on the piston 17 and open the valve 8; and if the valve 32 is then operated, water may be discharged from the tank 2.

Referring to Figs. 9 and 10, I have illustrated another form of mechanism in which the operation of the valve 8 is controlled by a lock and release device. In these views, 34 indicates a rock shaft extending through the valve casing 7 on the inner side of the valve 8. The walls of the casing 7 are formed with suitable aligned recesses 35, 35, the latter extending through the casing wall so that the rock shaft 34 can extend outside the casing and be provided with a suitable handle, such as shown at 36 (see Fig. 9). 37 indicates a packing or gland for the rock shaft. 38 indicates a device fixed to and projecting laterally from the rock shaft 34 and arranged to engage with the valve 8 and hold or lock it against its seat, when the shaft is moved in one direction to the position shown in full lines in Figs. 9 and 10. If the shaft 34 is rotated in the opposite direction (see dotted lines in Fig. 10), it will release the valve 8 and permit it to be opened by the piston 17. The axis of the rock shaft 34 preferably cuts the axis of the valve stem 15 and the locking and releasing device is preferably arranged, when in the locking position, to engage the valve 8 at a point coincident with the axis of its stem. As a result, the device 38 will serve to maintain the valve 8 against its seat when engaged therewith. 39 indicates a pair of collars disposed on the rock shaft 34 at opposite sides of the locking device 38, these collars being preferably provided to prevent endwise movement of the rock shaft 34.

In this form of construction, the locking and releasing device 38 is normally maintained in the locking position, as shown in Figs. 9 and 10. As the device 38 is not connected to the valve 8, it may be moved to the position shown in dotted lines in Fig. 10 and if sufficient vapor pressure has been generated in the tank 2, the piston 17 will open the valve; otherwise the valve 8 will remain closed, as already set forth.

From the foregoing descriptions it will be seen that I have provided means for controlling the operation of the discharge valve and that in each instance these control means are operable at will, at any time, without danger of the operative prematurely discharging water into the coffee making apparatus and spoiling the ground coffee placed therein. As the control means is operable at any time, the operative may operate the same to find out whether or not the water has reached the condition for use.

In Fig. 11 I have shown a further modified form of construction in which the casing 7 is disposed vertically instead of horizontally. When the casing 7 is arranged vertically, the spring 21 may be eliminated and the force of gravity utilized to maintain the valve 8 against its seat. In this arrangement the casing 7 is connected to the tank 2 and pipe 11 by elbows 39, 40, respectively.

To those skilled in the art of making mechanism of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In mechanism of the class described, the combination with a liquid receptacle and means for heating the liquid therein, of a discharge conduit from said receptacle, a discharge valve in the said conduit, automatic means actuated by pressure of vapor generated in the receptacle, arranged to open the valve to permit flow through the discharge conduit, and manually controlled means for governing the discharge flow irrespective of the operation of the said automatically actuated means.

2. In mechanism of the class described, the combination with a liquid receptacle and means for heating the liquid therein, of a liquid discharge conduit from the said receptacle, a discharge valve in said conduit, automatic means actuated by pressure of vapor generated in the receptacle arranged to open the valve in the discharge conduit, and manually controlled means located in the discharge conduit for controlling the flow of liquid therethrough, said manual means operating independently of the said automatically operating means.

3. In mechanism of the class described, the combination with a liquid supply receptacle, a mixing apparatus, and means for heating the liquid in said receptacle, of a discharge conduit leading from said receptacle to said apparatus, means interposed in said conduit and arranged to be actuated by pressure of the vapor generated in said receptacle to permit flow of the liquid through said conduit, and separate manually operated means supplemental to said pressure actuated means for permitting flow of the liquid through said conduit.

4. In mechanism of the class described, a liquid receptacle, a conduit for the liquid leading from the lower portion of said receptacle, said conduit having a valve seat, a conduit leading from the upper portion of said receptacle, means for heating the liquid within said receptacle, a pair of connected elements, each movably mounted in one of said conduits, the element in the first mentioned conduit comprising a valve acted upon by the pressure of the liquid in said receptacle to maintain it against said valve seat and the element in the other conduit comprising a piston acted upon by pressure due to generation of vapor in said receptacle to move said valve away from its valve seat, and a manually actuated valve in said conduit arranged to permit flow of the liquid therethrough after the first mentioned valve has been moved away from its seat.

5. In mechanism of the class described, a liquid receptacle having a liquid discharge conduit, a valve in said conduit, a cylinder, a piston in said cylinder connected to said valve, a conduit leading from said receptacle to said cylinder at one side of the piston therein, whereby pressure within said receptacle will move said valve in one direction, and separate means in said conduit arranged to be actuated manually and effect discharge of the liquid when the pressure in said receptacle is sufficient to actuate said valve.

6. In mechanism of the class described, a liquid receptacle having a liquid discharge conduit, a valve in said conduit, a cylinder, a piston in said cylinder connected to said valve, a conduit leading from said receptacle to said cylinder at one side of the piston therein, whereby pressure within said receptacle will open said valve, and separate means in said conduit beyond said valve arranged to be manually actuated and effect discharge of the liquid wherever said valve has been opened.

7. In mechanism of the class described, a liquid receptacle having a liquid discharge conduit, a valve in said conduit, means tending to maintain said valve closed, means for heating the liquid in said receptacle, a cylinder having a piston therein connected with said valve, said piston having an area greater than the area of said valve, a conduit leading from said receptacle for conveying vapor generated therein to said cylinder at one side of the piston, whereby the latter is operated to open said valve, and a valve in said discharge conduit for controlling the flow of the liquid therethrough in the event said first mentioned valve has been opened.

8. In mechanism of the class described, the combination with a water holding tank and means for heating the water, of a casing provided with a water receiving conduit connected to said tank, a water discharging conduit and a vapor conduit connected to said tank, a valve in said casing between said water receiving and discharging conduits arranged to permit the flow of water from said tank, a piston slidably mounted in said casing and operatively connected to said valve and arranged to be acted on by the vapor conducted from the tank to the casing through said vapor conduit, and mechanism in said water receiving conduit for controlling the operation of said piston.

9. In mechanism of the class described, the combination with a water holding tank and means for heating the water, of a casing connected to said tank and provided with a water discharging conduit and a vapor conduit connected to said tank, a valve in said casing arranged to permit the flow of water from said tank, a piston slidably mounted in said casing and operatively connected to said valve and arranged to be acted on by the vapor conducted from the tank to the casing through said vapor conduit, and mechanism in said water discharging conduit permitting flow of the water therethrough whenever said valve has been operated by said piston.

10. In mechanism of the class described, the combination with a water holding tank and means for heating the water, of a casing connected to said tank and formed with an outlet for the water, a vapor conduit connected to said tank and said casing, a valve in said casing arranged to permit the flow of water from said tank through said outlet, a piston slidably mounted in said casing and operatively connected to said valve and arranged to be acted on by the vapor conducted from the tank to the casing through said vapor conduit, and mechanism in said outlet for controlling the operation of said piston.

11. In mechanism of the class described, the combination with a water holding tank and means for heating the water therein, of a casing connected to said tank, a water discharging conduit connected to said casing, a vapor conduit connected to said tank and said casing, a valve in said casing arranged to permit the flow of water from said tank to said discharging conduit, a piston slidably mounted in said casing and operatively connected to said valve and arranged to be acted on by the vapor conducted from the tank to the casing through said vapor conduit, and a valve in said discharging conduit for controlling the flow of the water therethrough.

12. In mechanism of the class described, the combination with a water holding tank and means for heating the water therein, of a casing connected to said tank and formed with an outlet for the water, a vapor conduit connected to said tank and casing, a valve in said casing arranged to permit the flow of water from said tank through said outlet, a piston slidably mounted in said casing and operatively connected to said valve and arranged to be acted on by the vapor conducted from the tank to the casing through said vapor conduit, and mechanism in said casing arranged to engage said valve to lock it to its seat and to disengage the valve to permit it to be operated by said piston.

13. In mechanism of the class described, the combination with a water holding tank and means for heating the water therein, of a casing connected to said tank and formed with an outlet for the water, a vapor conduit connected to said tank and casing, a valve in said casing arranged to permit the flow of water from said tank through said outlet, a piston slidably mounted in said casing and operatively connected to said valve and arranged to be acted on by the vapor conducted from the tank to the casing through said vapor conduit, and a swingable member in said casing arranged to engage said valve to lock it to its seat and to disengage the valve to permit it to be operated by said piston.

In testimony whereof I affix my signature.

HOWARD I. MORRIS.